UNITED STATES PATENT OFFICE.

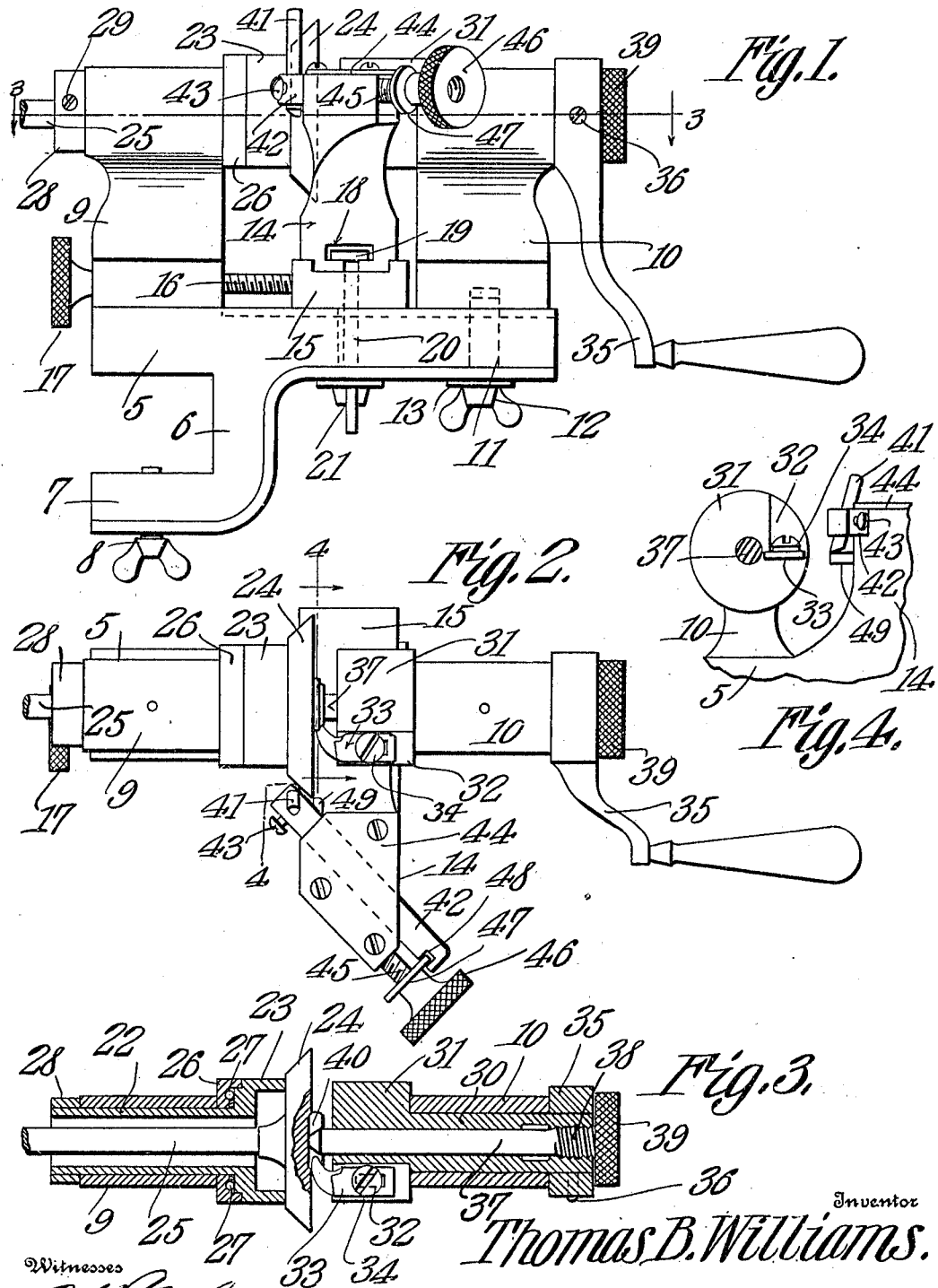

THOMAS B. WILLIAMS, OF ORANGE, MASSACHUSETTS, ASSIGNOR TO THE LEAVITT MACHINE CO., OF ORANGE, MASSACHUSETTS.

VALVE-RESEATING TOOL.

956,918. Specification of Letters Patent. Patented May 3, 1910.

Application filed May 24, 1909. Serial No. 497,957.

*To all whom it may concern:*

Be it known that I, THOMAS B. WILLIAMS, a citizen of the United States, residing at Orange, in the county of Franklin and State of Massachusetts, have invented a new and useful Valve-Reseating Tool, of which the following is a specification.

This invention relates to valve reseating tools of the portable type, its object being to provide in a tool of this kind improved means for rotating a valve against a stationary tool, together with an improved holder which will properly center the valve.

Another object of the invention is to provide a tool of the kind stated which can be easily and quickly operated, and one which will reseat the valve smoothly, accurately, and true.

With the hereinstated objects in view, the invention consists in a novel construction and arrangement of parts to be hereinafter described and claimed, reference being had to the drawing hereto annexed forming a part of this specification, in which drawing—

Figure 1 is a front elevation of the tool. Fig. 2 is a plan view. Fig. 3 is a horizontal section on the line 3—3 of Fig. 1. Fig. 4 is a transverse section on the line 4—4 of Fig. 2.

Referring to the drawing by reference numerals, 5 denotes a bed or base which supports the working parts of the tool. From the under side of the bed depends a bracket 6 having a laterally extending branch 7 through which is threaded a set screw 8 for attachment of the tool to a work bench or other support, the edge of said support being received between the bed 5 and the branch 7, the latter extending parallel to the bed.

On the bed 5 is mounted a head stock 9, and a tail stock 10, the former being rigidly secured to the bed, and the latter being slidable lengthwise thereon, so that it may be adjusted toward and from the head stock, and also removed from the bed. The bed has a guideway in which the tail stock is slidably mounted, and it is held at adjustment by a threaded stem 11 which extends through a slot in the bed and screws into the bottom of the tail stock, said stem being provided with a wing nut 12 which engages the under side of the bed, there being a washer 13 interposed between said parts.

At 14 is indicated a tool post which is mounted on a block 15 to slide transversely of the bed, and the block is slidable lengthwise on the bed, being mounted in a guideway thereon. For the purpose of adjusting the block, and holding it at adjustment, a traveling screw 16 is connected to the block, said screw being threaded through the head stock, and being provided with a milled fingerpiece 17 to facilitate its operation. The top of the block 15 is formed with a guideway in which the tool post 14 is slidably mounted, the bottom of the tool post having an undercut groove 18 which is engageable by the head 19 of a threaded stem 20 extending through the block 15 and through a slot in the bed 5, and projecting from the under side of the latter, a wing nut 21 being screwed on said projecting end of the stem.

The head stock is formed with a bearing in which is mounted a tubular mandrel 22 which projects at its ends from the bearing. On the outside of the bearing, one end of the mandrel is enlarged as indicated at 23, and the outer end of said enlargement is adapted to engage one side of a valve 24 to be operated on, said side being the one from which a valve stem 25 extends, the latter extending through the bore of the mandrel. The enlargement 23 forms a shoulder between which and the adjacent end of the bearing, a ring 26 loosely encircles the mandrel, there being antifriction balls 27 interposed between the ring and the shoulder. On that end of the mandrel which projects from the opposite end of the bearing is mounted a collar 28 which engages said end of the bearing, and serves to hold the mandrel in place in the bearing. The collar is secured by a set screw 29 so that it may be adjusted on the projecting end of the mandrel to take up wear, and to adjust the ball retaining ring 26.

The tail stock is formed with a bearing in which is rotatably mounted a tubular spindle 30 projecting from the ends thereof, that projecting end of the spindle which is opposite the head stock being formed with an enlargement or head 31 recessed on one side as indicated at 32. In this recess is mounted a finger in the shape of a flat blade 33. A screw 34 passing through a slot in the blade and entering the head holds the blade at adjustment so that it may be projected in advance of the head more or less. On the other projecting end of the spindle is mounted a crank handle 35, the hub of which engages the adjacent end of the bearing, and as the opposite end of the bearing is engaged by the enlargement 31, the spindle is held in place in the bearing. A set screw 36 passing through the hub of the crank handle, is screwed against the projecting end of the spindle to fasten said crank handle to the spindle.

The centering device is a pin 37 which is pointed at one of its ends to engage the center of the valve 24. This pin is mounted in the bore of the spindle 30, and has a threaded portion 38 which is engageable with a threaded portion in said bore, whereby the pin is advanced or retracted when it is rotated, its outer end being provided with a fingerpiece 39 to facilitate such rotation.

That side of the valve 24 which is engaged by the spindle 30 is so connected with said spindle that it will rotate when the spindle is rotated by the crank handle 35. The cutting tool to be presently described is stationary and the valve is adapted to be rotated against the same.

To place the valve in its holder, the tail stock 10 is removed from the bed 5, and the valve placed against the enlarged head of the mandrel 22 as shown in Fig. 3 with the stem 25 of the valve extending through the bore of the mandrel. The tail stock is now replaced and slid forwardly in the direction of the head stock until the finger 33 enters the slot 40 after which the tail stock is clamped fast to the bed. The center pin 37 is now advanced until it engages the valve center and clamps the same against the end of the mandrel. The valve is now rotated against the cutting tool upon turning the crank handle 35, the valve being coupled to the spindle 30 by the engagement of the finger 33 with the slot 40.

At 41 is indicated the tool for dressing the face of the valve 24. Said tool is carried by a holder 42, it being mounted in an opening made in said holder, and held at adjustment in said opening by a set screw 43. The holder 42 is slidably mounted in a guideway in the top of the tool post 14 under a cover plate 44 secured to said top. On the tool post is mounted a screw-threaded stem 45 on which is screwed a nut 46 formed with a circular collar 47 which works in a notch 48 made in the holder 42. The stem 45 is stationary, and the nut 46 is adapted to travel thereon upon being rotated, whereby the holder 42 is adjusted to bring the tool 41 into proper position with respect to the valve face to be operated on. The holder 42 extends parallel to the beveled face of the valve, as shown in Fig. 2 of the drawing, in order that the cutter 41 may be caused to travel in a path parallel and corresponding to said beveled face. Projecting horizontally from the tool post 14 is a pin 49 which serves as a gage for setting the cutter 41. The upper surface of the pin is level with the horizontal center of the valve, and the cutter is adapted to be adjusted in the holder 42 so that its working end is level with said surface whereby the cutter is properly positioned with respect to the valve face.

In operation, the valve to be reseated is clamped to the mandrel as already described, and rotated against the cutter 41 by turning the crank handle 35. This can be done with one hand, leaving the other hand free to advance the cutter along the face of the valve by turning the nut 46.

By the use of the tool hereindescribed the long and tedious process of grinding the valve with emery and oil is dispensed with, and the valve can be reseated as hereindescribed better than it could be by grinding, and also in less time. The tool is portable and recuts the valve as accurately as the work could be done in an expensive lathe, and it will do the work in less time than is required to get a lathe rigged to do the job.

What is claimed is:

1. In a valve reseating tool, a rotatable work support, a rotatable member carrying a centering device movable in the direction of its length into engagement with the work for clamping the same against the support, means carried by the rotatable member for coupling the said member to the work, and means for rotating said member to rotate the work.

2. In a valve reseating tool, a rotatable work holder, a tubular spindle, a centering point mounted in the bore of the spindle, and movable in the direction of its length into engagement with the work for clamping the same against the holder, means for coupling the spindle to the work, and means for rotating the spindle.

3. In a valve reseating tool, a work holder in which the work is mounted to rotate therewith, a tubular spindle, a centering point mounted in the bore of the spindle, and movable in the direction of its length into engagement with the work for clamping the same to the holder, and a finger carried by the spindle and engageable with a slot in the work, whereby the latter is coupled to the spindle.

4. In a valve reseating tool, a bed, a rotatable work holder on the bed, a bearing on the bed, a tubular spindle mounted in said bearing, and having an enlargement at one end engageable with one end of the bearing, driving means fitted to the other end of the spindle and engageable with the other end of the bearing, a centering device mounted in the bore of the spindle, and movable therein in the direction of its length into engagement with the work for clamping the same to the work holder, and means for coupling the spindle to the work.

5. In a valve reseating tool, axially alined rotatable members, one of said members having means for supporting the work, a centering device carried by the other member, and slidable in the direction of its length into engagement with the work for clamping the same to the first mentioned member, and means for coupling the second mentioned member to the work.

6. In a valve reseating tool, a bed, a rotatable work holder thereon which carries the work, a bearing on the base, a tubular spindle mounted in the bearing, and having an enlargement at one end engageable with one end of the bearing, a crank handle fitted to the other end of the spindle and engageable with the other end of the bearing, a centering device mounted in the bore of the spindle and engageable with the work, said device having a screw-threaded engagement with the bore of the spindle and means for coupling the spindle to the work.

7. In a valve reseating tool, a bed, a bearing thereon, a tubular mandrel rotatably mounted in said bearing, and enlarged at one of its ends to form a shoulder, a ring on the mandrel between said shoulder and one end of the bearing, anti-friction balls between the ring and the shoulder, and a fixed collar on the other end of the mandrel engageable with the other end of the bearing.

In testimony that I claim the foregoing as my own, I have hereto affixed my signature in the presence of two witnesses.

THOMAS B. WILLIAMS.

Witnesses:
JAMES D. KIMBALL,
BURTON C. BANGS.